No. 813,033. PATENTED FEB. 20, 1906.
F. A. BELLAMY.
TUBE CLIP.
APPLICATION FILED MAY 16, 1905.

WITNESSES:
Chas. K. Davies.

INVENTOR
Frederick A. Bellamy,
By
Fenelon B. Brock
Attorney

UNITED STATES PATENT OFFICE.

FREDERICK A. BELLAMY, OF LONDON, ENGLAND.

TUBE-CLIP.

No. 813,033.  Specification of Letters Patent.  Patented Feb. 20, 1906.

Application filed May 16, 1905. Serial No. 260,718.

*To all whom it may concern:*

Be it known that I, FREDERICK A. BELLAMY, a citizen of Great Britain, residing at London, England, have invented a new and useful Tube-Clip, of which the following is a specification.

My invention relates to clips for securing tubes of flexible or compressible material, such as rubber, to other tubes or similar structures of harder material, such as iron or other metallic pipe. It may be used in any instance where it is desired to make connection between a flexible tube and an inflexible tube for carrying fluid of any kind.

The clip is simple, produced from standard commercial material, easy and economical to manufacture, and is very efficient, affording a means for very tightly clamping the flexible tube, and one that is not liable to accidental disengagement.

Exemplifying structures embodying my invention will be fully described in connection with the accompanying drawings, in which—

Figure 1:
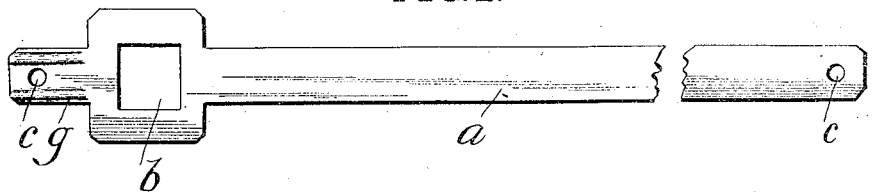
Figure 2:
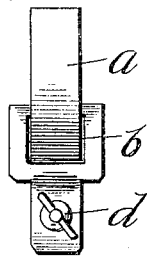
Figure 3:
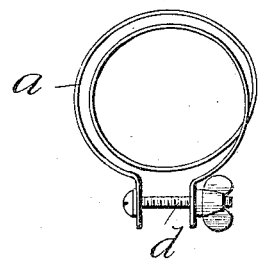
Figure 4:
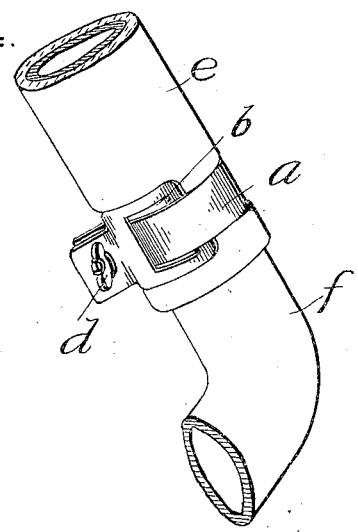
Figure 6:
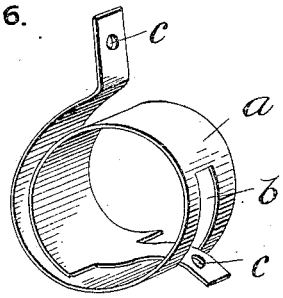
Figure 5:
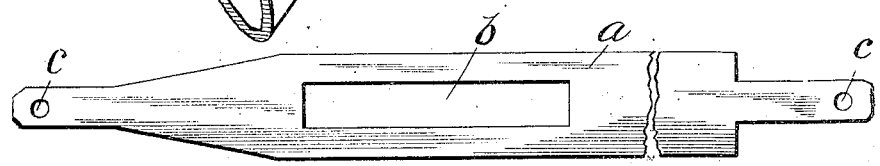

Figure 1 is a plan view of the body of the clip in a partially-completed condition; Fig. 2, a side view of the completed clip of the structure of Fig. 1; Fig. 3, an end view of Fig. 2; Fig. 4, a side view of the clip clamped in place on a hose or flexible tube; Fig. 5, a plan view of a modified form of the clip in a partially-completed condition, and Fig. 6 is a perspective view of the clip shown in Fig. 5 in a further completed condition.

Referring to Fig. 1, $a$ designates the clip as a whole as it is formed, preferably, by stamping from sheet metal (iron, steel, or other material) of suitable thickness. The general shape of the unassembled body is a long rectangular strip. Near one end of the body is a wider portion affording room in which to provide an aperture $b$, which may be of variable length, but must have a width at least equal to that of the major portion of the body. Approximate to each end of the body is provided a hole $c$.

The body having been produced in the shape indicated, it is "assembled" or completed by inserting the end of the longer straight portion of the body through the aperture $b$ and coiling the body so that it will remain in the approximate shape shown in Fig. 3. The figure shows for purposes of illustration the convolutions of the body slightly separated one from the other; but as actually manufactured they may be made to lie perfectly close to each other, forming a very compact structure. The bolt $d$ is inserted through the holes $c$, and a thumb-nut is screwed onto the bolt, thereby serving to bring the ends of the body together, as desired.

The method of attaching the clip is obvious, but will be briefly described. As seen in Fig. 4, $f$ represents a pipe or tube of comparatively hard substance over which a flexible tube $e$, such as a rubber pipe sufficiently large to be slipped or forced over the tube $f$ is placed, the clip $a$ having first been placed over one end of either tube. The clip is then placed in position near one end of the rubber tube, and its ends are drawn together by means of the thumb-nut, thereby securely binding the flexible tube to the other tube. The clip is preferably made of spring metal, so that after use it may be used again and again, as by unscrewing the nut it will naturally assume its open position; but this is not essential.

Another form of construction is shown in Fig. 5, in which the main portion $a$ of the body is considerably wider than the ends in which are punched the holes $c$. The clip is completed in a similar manner to the other, as will be understood from Fig. 6, in which the clip is shown partially coiled.

If desired, the ends of the body may be crimped or corrugated longitudinally ($g$, Fig. 1) in any suitable manner familiar to sheet-metal workers for imparting stiffness thereto. Preferably the clip is made long enough to pass twice around the tube which is intended to be gripped, affording means for obtaining a great deal of constrictive force and securely clamping the tube at all points without any break. The form and proportions of the clip may be widely varied to meet varying conditions.

What I claim is—

1. A flat metallic strip having a widened portion near one end and a short aperture in said widened portion, said strip being formed into a constrictive clamp by passing one end of the strip through said aperture and coiling the strip so that one portion of the coil lies outside an inner portion thereof.

2. A flat metallic strip having a widened portion near one end and a short aperture in said widened portion, said strip being formed into a constrictive clamp by passing one end of the strip through said aperture and coiling the strip so that one portion of the coil lies outside an inner portion thereof, and also having a short part of each end of said strip turned out at a right angle to the rest of the clip and perforated to accommodate a bolt for tightening the clip by means of a nut or the like.

3. A tube-clip consisting of a coiled metallic strip so formed that a single coil of uniform width encircles the tube to be clamped and a portion of said strip passes through an aperture thereof and encircles the first coil mentioned, and having bent portions of said strip adapted to receive a locking device such as a bolt and nut.

4. A tube-clip consisting of a coiled metallic strip, so formed that a single coil encircles the tube to be clamped and a portion of said strip passes through an aperture thereof and encircles the first coil mentioned, and having bent portions of said strip adapted to receive a locking device such as a bolt and nut.

5. A tube-clip consisting of a coiled metallic strip so formed that a single coil encircles and contacts with the tube to be clamped and a portion of said strip passes through an aperture therein and encircles the coil first mentioned.

In testimony whereof I have affixed my signature in the presence of two witnesses.

FRED. A. BELLAMY.

Witnesses:
ALFRED NUTTING,
H. D. JAMESON.